United States Patent [19]

Johansson

[11] 4,115,153

[45] Sep. 19, 1978

[54] METHOD AT GAS PLANING

[75] Inventor: Bengt Johansson, Göteborg, Sweden

[73] Assignee: Centro-Maskin Göteborg AB, Göteborg, Sweden

[21] Appl. No.: 815,373

[22] Filed: Jul. 13, 1977

[30] Foreign Application Priority Data

Jul. 19, 1976 [SE] Sweden ................................ 7608209

[51] Int. Cl.² ............................ B23K 7/00; B23K 7/06
[52] U.S. Cl. ...................................... 148/9.5; 266/49; 266/51
[58] Field of Search ...................... 148/9.5; 266/51, 49

[56] References Cited

U.S. PATENT DOCUMENTS

| | | | |
|---|---|---|---|
| 2,363,089 | 11/1944 | Scherl | 148/9.5 |
| 3,850,704 | 11/1944 | Taggart | 148/9.5 |
| 3,870,571 | 3/1975 | Monreal et al. | 148/9.5 |

Primary Examiner—W. Stallard
Attorney, Agent, or Firm—Thompson, Birch, Gauthier & Samuels

[57] ABSTRACT

A method of gas planing for removing surface defects on a workpiece, where the working gas is supplied to the workpiece via a planing device, and air or another non-oxidizing gas mixture under pressure is supplied to the melt at the completion of the planing operation.

2 Claims, No Drawings